United States Patent
Holmes

(10) Patent No.: US 11,838,985 B2
(45) Date of Patent: Dec. 5, 2023

(54) POLICY-BASED MANAGEMENT OF EMBEDDED SUBSCRIBER IDENTITY MODULE (ESIM) PROFILES

(71) Applicant: T-Mobile Innovations LLC, Overland Park, KS (US)

(72) Inventor: David William James Holmes, Sammamish, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 169 days.

(21) Appl. No.: 17/461,248

(22) Filed: Aug. 30, 2021

(65) Prior Publication Data
US 2023/0064075 A1 Mar. 2, 2023

(51) Int. Cl.
H04W 8/18 (2009.01)
H04W 88/02 (2009.01)
H04W 12/30 (2021.01)
H04W 12/37 (2021.01)

(52) U.S. Cl.
CPC .............. *H04W 8/18* (2013.01); *H04W 12/35* (2021.01); *H04W 12/37* (2021.01); *H04W 88/02* (2013.01)

(58) Field of Classification Search
CPC ........ H04W 8/18; H04W 12/37; H04W 12/35
See application file for complete search history.

(56) References Cited

U.S. PATENT DOCUMENTS 8,588,850 B1 * 11/2013 Venkataramu ...... H04W 12/068
455/67.11
10,433,156 B1 * 10/2019 Long ..................... H04W 8/205
2016/0057624 A1 * 2/2016 Yang ...................... G06F 21/32
455/411
2019/0253884 A1 * 8/2019 Fan ........................ H04W 8/183
2019/0289455 A1 9/2019 Namiranian
2019/0364415 A1 * 11/2019 Gao ........................ H04W 8/20
2021/0392491 A1 * 12/2021 Chen ..................... H04W 8/183

FOREIGN PATENT DOCUMENTS

EP 2854432 A1 4/2015
WO 2019018244 A1 1/2019
WO 2019018245 1/2019

OTHER PUBLICATIONS

Foreign Communication From a Related Counterpart Application, International Search Report and Written Opinion dated Nov. 23, 2022, International Application No. PCT/US2022/041086.

* cited by examiner

*Primary Examiner* — Barry W Taylor

(57) ABSTRACT

A method of managing embedded subscriber identity modules (eSIMs) on a user equipment (UE). The method comprises receiving a request to manage an eSIM profile stored on the UE by an embedded universal integrated circuit card (eUICC) of the UE from a requestor; looking up a set of eSIM profile management rules in the eSIM profile by the eUICC; determining an eSIM profile management rule of the set of eSIM profile management rules that applies to the eSIM profile by the eUICC based on an identity of the requestor; determining to deny the request by the eUICC based on the identity of the requestor, based on the request, and based on the eSIM profile management rule; and, based on denying the request, executing a rejection method, wherein the rejection method is defined by the eSIM profile management rule.

18 Claims, 9 Drawing Sheets

POLICY-BASED MANAGEMENT OF EMBEDDED SUBSCRIBER IDENTITY MODULE (ESIM) PROFILES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Wireless communication devices may be provided with data and executable instructions that enable them to connect to a wireless communication network, for example to connect to a cellular wireless communication network. The data and executable instructions may be provided in the form of subscriber identity module (SIM) smart cards that are removable. By removing a first SIM card with data and instructions associated with a first wireless communication service provider from a user equipment (UE) and installing a second SIM card with data and instructions associated with a second wireless communication service provider, the UE may be able to communicate via the communication services provided by the second wireless communication service provider. Removable SIM cards may be replaced by embedded SIM cards in later model UEs. For example, an embedded universal integrated circuit card (eUICC) may be wired onto a motherboard of a UE and provide the appropriate data and instructions to attach to a wireless communication network. The data and instructions for attaching to a wireless communication network may be referred to as an eSIM profile in some contexts.

SUMMARY

In an embodiment, a method of managing embedded subscriber identity modules (eSIMs) on a user equipment (UE) is disclosed. The method comprises storing a first eSIM profile in an embedded universal integrated circuit card (eUICC) of the UE, wherein the first eSIM profile comprises a first data artifact that defines a first set of eSIM profile management rules for the first eSIM profile; receiving a first request to manage the first eSIM profile by the eUICC from a first requestor; and looking up the first set of eSIM profile management rules in the first data artifact in the first eSIM profile by the eUICC. The method further comprises determining a first eSIM profile management rule of the first set of eSIM profile management rules by the eUICC that applies to the first eSIM profile based on an identity of the first requestor and performing a first eSIM profile management action by the eUICC on the first eSIM profile based on the first eSIM profile management rule. The method further comprises receiving a second request to manage the first eSIM profile by the eUICC from a second requestor; determining a second eSIM profile management rule of the first set of eSIM profile management rules by the eUICC that applies to the first eSIM profile based on an identity of the second requestor; and performing a second eSIM profile management action by the eUICC on the first eSIM profile based on the second eSIM profile management rule, wherein the second eSIM profile management action is different from the first eSIM profile management action.

In another embodiment, a user equipment (UE) that provides management of embedded subscriber identity module (eSIM) profiles is disclosed. The UE comprises a cellular radio transceiver, a processor, and an embedded universal integrated circuit card (eUICC) storing a plurality of eSIM profiles, wherein each eSIM profile comprises a data artifact that defines a set of eSIM profile management rules. The eUICC receives a first request to manage a first eSIM profile from a first requestor, where the first eSIM profile is one of the plurality of eSIM profiles stored in the non-transitory memory, looks up a first set of eSIM profile management rules stored in a data artifact of the first eSIM profile, determines a first eSIM profile management rule of the first set of eSIM profile management rules that applies to the first eSIM profile based on an identity of the first requestor, and performs a first eSIM profile management action on the first eSIM profile based on the first eSIM profile management rule.

In yet another embodiment, a method of managing embedded subscriber identity modules (eSIMs) on a user equipment (UE) is disclosed. The method comprises receiving a first request to manage an eSIM profile by an embedded universal integrated circuit card (eUICC) of the UE from a first requestor, wherein the eSIM profile is stored in the eUICC; looking up a set of eSIM profile management rules in a data artifact in the eSIM profile by the eUICC; determining a first eSIM profile management rule of the set of eSIM profile management rules that applies to the eSIM profile by the eUICC based on an identity of the first requestor; determining to deny the first request by the eUICC based on the identity of the first requestor, based on the first request, and based on the first eSIM profile management rule; and based on denying the first request, executing a rejection method, wherein the rejection method is defined by the first eSIM profile management rule.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
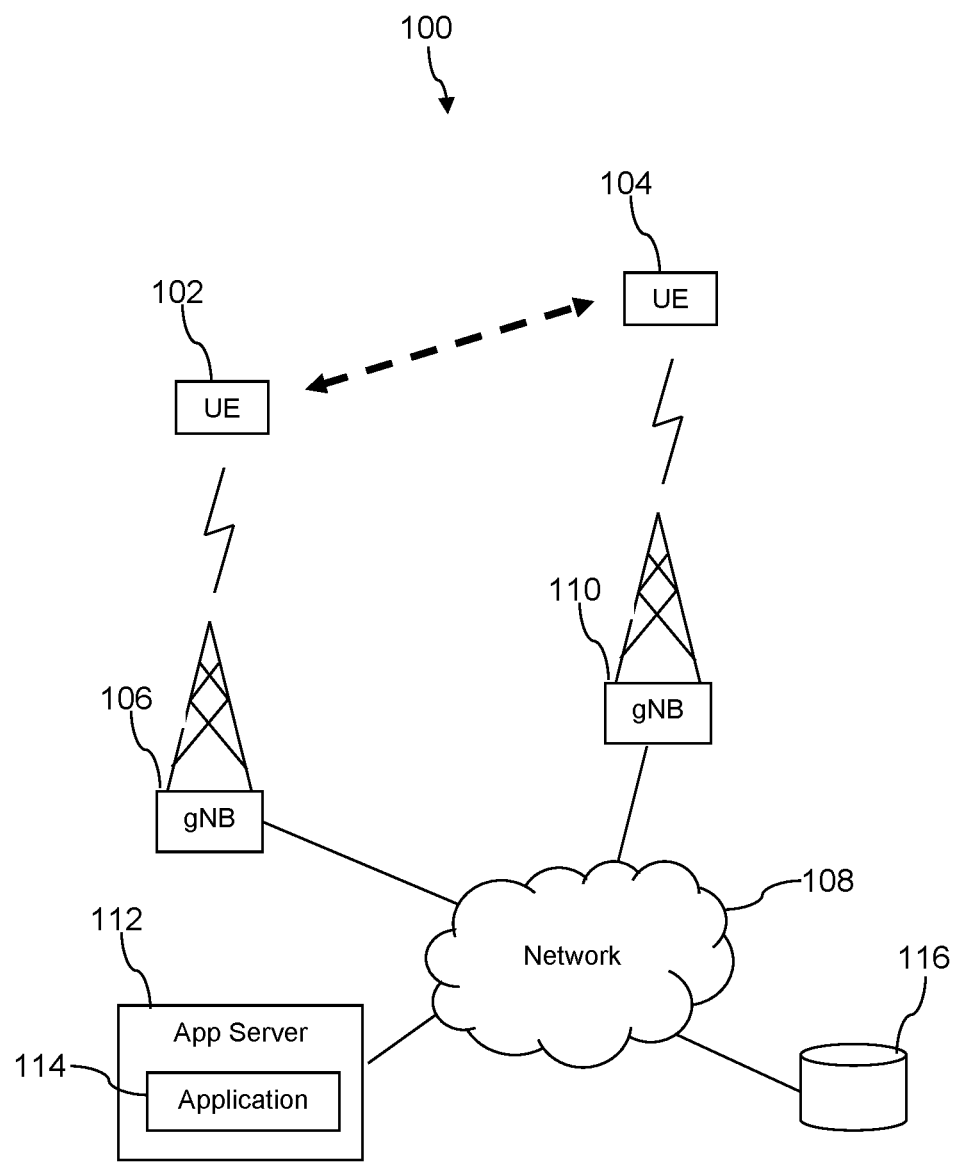
FIG. 1 is a block diagram of a communication system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A local profile assistant (LPA) on a user equipment (UE) may provide an application programming interface (API) for a local user interface of the UE, in response to device user inputs, to switch active eSIM profiles on the UE. The LPA may provide an API for other applications executing on the UE to manage embedded subscriber identity module (eSIM) profiles on the UE. An eSIM profile comprises wireless communication service provider data, wireless communication service subscriber data, and optionally executable instructions. For example, an eSIM profile may comprise one or more of (1) a phone number, (2) network access keys and network access credentials, (3) encryption keys, (4) preferred roaming lists (PRLs), (5) branding content, and/or (6) executable applications. The eSIM profile provides information used by a cellular radio transceiver to attach to a radio access network (RAN) and to receive wireless communication service, for example to attach to a cell site to receive a wireless communication link. As such, the ability to manage such eSIM profiles carries with it security and cyber identity theft implications.

In the past, ability to initiate eSIM profile management actions by other than the device user may have been very restricted, for example only allowing an original equipment manufacturer (OEM) of the UE or a wireless communication service provider who owns an eSIM profile to take eSIM profile management actions on that eSIM profile. Alternatively, the eSIM profile management actions may have been restricted to allowing an OEM of the UE, a service provider who owns the eSIM profile, or a device user of the UE to initiate eSIM profile management actions on the eSIM profile. These restrictions may be undesirably inflexible, may be inefficient, and may result in excessive network traffic burdens to work around these restrictions. An example of a work-around that might develop under such restricted circumstances is that a system application might establish a communication session with a service provider and request the service provider to perform the eSIM profile management action on the behalf of the system application. Such a work-around would involve more network traffic and burden on computing resources than if the system application were allowed to initiate the eSIM profile management action directly on the UE itself. On the other hand, just allowing all and any application to undertake any eSIM profile management action presents security threats and the prospect of "slamming"—a predatory practice of forcing a change of service provider without user and/or subscriber permission.

The present disclosure teaches a system and method of encapsulating within an eSIM profile a set of eSIM profile management rules. Because the eSIM profile management rules are encapsulated within the eSIM profile, the eSIM profile management rules are protected from tampering by the same protections applied to the conventional eSIM profile contents themselves. A wireless communication service provider that provides the wireless communication service subscription associated with a particular eSIM profile (e.g., the service provider owns the eSIM profile or has a proprietary interest in the eSIM profile) is thereby enabled to control eSIM management actions associated with its eSIM profile by defining the eSIM profile management rules encapsulated in its eSIM profile. The mediation of eSIM profile management action requests and the enforcement of eSIM profile management rules is performed on the UE which is efficient and lightens the traffic load on the network. Security is improved while functionality and flexibility are increased. Each wireless communication service provider can choose the level of freedom or restriction that it is comfortable with for those eSIM profiles that it owns.

In general, an application on the UE may request an eSIM profile management action via the API of the LPA, and the LPA may redirect this request to an embedded universal integrated circuit card (eUICC) where the eSIM profiles are stored. A set of eSIM profile management rules defines which eSIM profile management actions that are supported by the API of the LPA may be completed by the eUICC based on a category of an initiator, and the eUICC enforces those rules on the subject eSIM profile. The eSIM profile management rules may be considered to be profile policy rules, and the management of eSIM profiles by the eUICC based on these profile policy rules may be considered to be profile-based management of eSIM profiles.

For example, a device user's actions may be allowed/disallowed/required for initiating deleting or disabling an eSIM profile; an application installed in a system memory partition of the UE may be allowed/disallowed for initiating installing, enabling, deleting, or disabling an eSIM profile; a third-party application installed in the user memory partition of the UE may be allowed/disallowed for initiating installing, enabling, deleting, disabling eSIM profiles. In an example, a wireless communication service provider or an original equipment manufacturer (OEM) of the UE may control what applications may be installed in the system memory partition of the UE, and hence such applications may be granted privileges to perform (indirectly through the intermediary of the LPA and of the eUICC) eSIM profile management actions that would be denied to applications installed in the user memory partition of the UE.

In an example, a set of eSIM profile management rules may allow system applications to perform at least some eSIM profile management actions but only allow user applications to perform the same eSIM profile management actions after announcing the requested eSIM profile management action to the user, prompting the user to consent to or to disapprove the action, and receiving a consent input from the user. For example, the eUICC may request that the LPA present a user interface screen on a display of the UE, the LPA may present the interface screen, receive input from the interface screen (e.g., input from a device user providing this input), and return the input to the eUICC. If the device user inputs a disapprove response, the eSIM profile management action request from the user application is denied by the eUICC.

In an embodiment, different eSIM profile management rules may be defined for different groups of user applications stored in the user memory partition, for example a first rule for approved user applications and a second rule for unapproved user applications. For example, approved user applications may be versions of third-party applications that have undergone some kind of qualification by the wireless communication service provider, by the OEM, or by a trusted third-party certification authority. In an embodiment, different eSIM profile management rules may be defined for different individual user applications. In an embodiment, a wireless communication service provider may be provided access to an API method of the LPA application to modify eSIM profile management rules in an eSIM profile that the carrier owns. The LPA and/or the eUICC would not allow a wireless communication service provider to modify a set of eSIM profile management rules encapsulated in an eSIM profile that the subject service provider does not own.

In an embodiment, a set of eSIM profile management rules may define a method or function to perform when a request to perform a management action on a eSIM profile is rejected by the eUICC. A rejection method may comprise presenting a specific message on a display of the UE. A rejection method may comprise sending a notification to the wireless communication service provider that owns the eSIM profile and/or to an OEM of the UE. A rejection method may comprise suspending execution privileges of the application that made the rejected request to manage the eSIM profile. The eUICC may request the LPA to execute the appropriate rejection method. In response, the LPA may execute the rejection method itself or request execution of the rejection method by an application stored in the system memory partition or by a server application executing on a server remote from the UE.

Turning now to FIG. 1, a communication system 100 is described. In an embodiment, the system 100 comprises a first user equipment (UE) 102 that receives a wireless communication link from a first cell site 106 according to one of a 5G, a long-term evolution (LTE), a code division multiple access (CDMA), or a global system for mobile communication (GSM) telecommunication protocol. The first cell site 106 may communicatively couple the first UE 102 to a network 108. The network 108 comprises one or more private communication networks, one or more public communication networks, or a combination thereof. The UE 102 may be a mobile phone, a smart phone, a wearable computer, a headset computer, a laptop computer, a notebook computer, a tablet computer, or an Internet of things (IoT) device. Likewise, the UE 104 may be a mobile phone, a smart phone, a wearable computer, a headset computer, a laptop computer, a notebook computer, a tablet computer, or IoT device. In an embodiment, the UE 102 is a different kind of device from the UE 104. A second cell site 110 may communicatively couple the second UE 104 to the network 108 according to one of a 5G, an LTE, a CDMA, or a GSM telecommunication protocol.

The UE 102 may communicate via the network 108 with an application server 112 that executes a server application 114. For example, a client application may execute on the UE 102 and receive services from the server application 114. The UE 102 may communicate via the network 108 to a content database 116, for example a web site that mediates access to content stored in the content database 116. The UE 102 may communicate via the network 108 to the second UE 104. The UE 102 may communicate with the first cell site 106 (e.g., attach to a radio access network (RAN) via the first cell site 106) based on wireless communication service provider data and wireless communication service subscriber data contained in an eSIM profile of the UE 102.

In an example, the first UE 102 and the second UE 104 represent the same physical device at different times. For example, the first UE 102 may attach to the first cell site 106 based on a first active eSIM profile, while the second UE 104 (in this example, the same physical device at a different time) may attach to the second cell site 110 based on a second active eSIM profile. The first eSIM profile and the first cell site 106 may be provided by a first wireless communication service provider and the second eSIM profile and the second cell site 110 may be provided by a second different wireless communication service provider.

Figure 2:
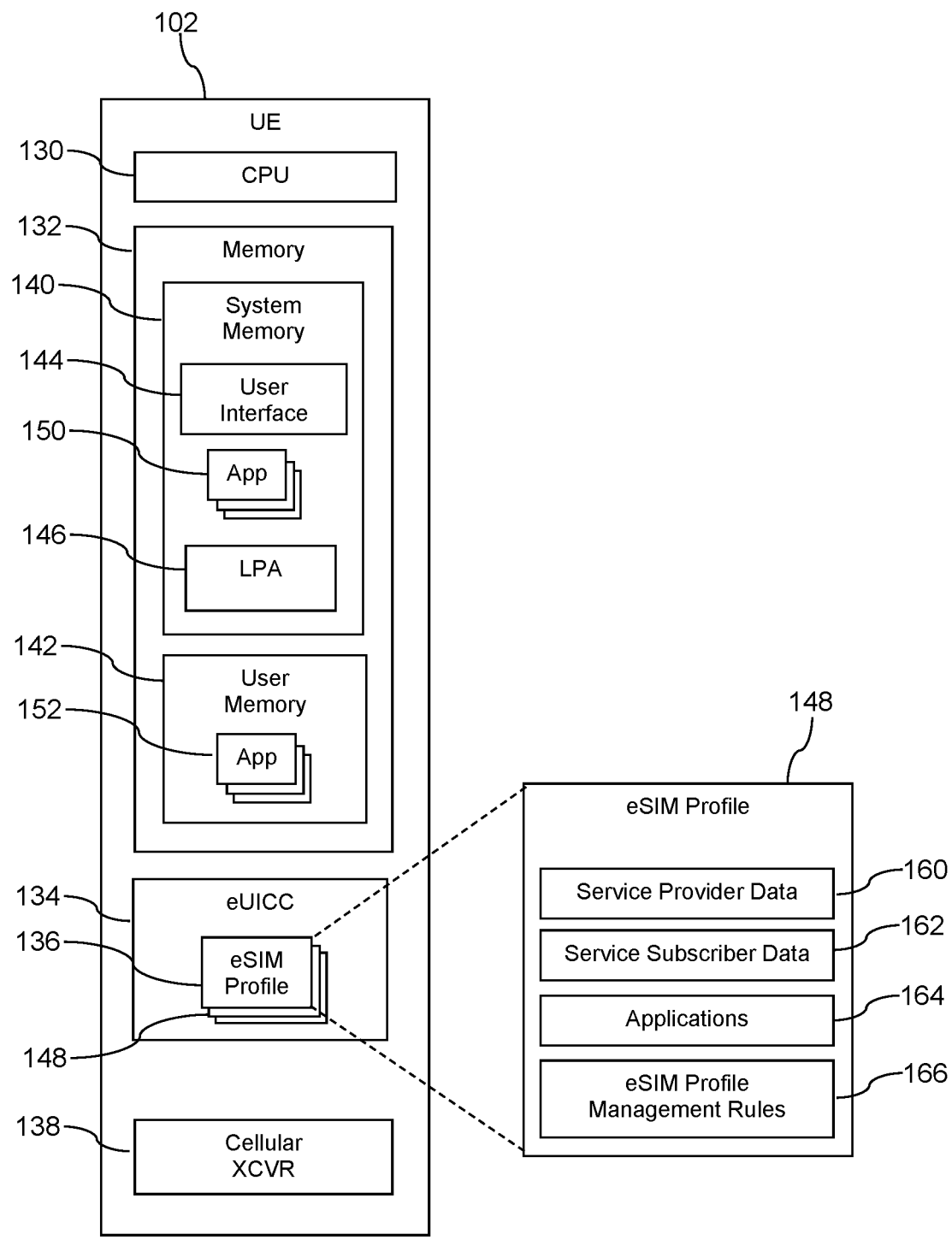
FIG. 2 is a block diagram of some components of a user equipment (UE) according to an embodiment of the disclosure.

Turning now to FIG. 2, further details of the UE 102 are described. In an embodiment, the UE 102 comprises a processor 130, a memory 132, an embedded universal integrated circuit card (eUICC) 134 comprising at least one active eSIM profile 136, and a cellular radio transceiver 138. In an embodiment, the UE 102 may support more than one eSIM profile being active on the UE 102 at the same time, for example when a physical UE 102 supports more than one virtual UE executing concurrently on the UE 102, where each different virtual UE is associated with a different active eSIM profile. While illustrated in FIG. 2 as being separate from the processor 130, in an embodiment the eUICC 134 may be integrated into the processor 130, for example integrated into a trusted portion (e.g., a secure element) of the processor 130.

The cellular radio transceiver 138 establishes wireless communication links with the cell site 106, 110 based on data provided to it by the eUICC 134 from the eSIM profile 136. The memory 132 comprises a non-transitory portion. The non-transitory portion of the memory 132 comprises a system memory 140 and a user memory 142. In some contexts, the system memory 140 may be referred to as a system memory portion or a system memory partition. In some contexts, the user memory 142 may be referred to as a user memory portion or a user memory partition.

The system memory 140 comprises a user interface 144, a local profile assistant (LPA) 146, and one or more system applications 150. The user interface 144 and the LPA 146 may be considered to be applications that are part of an operating system of the UE 102. The LPA 146 may comprise data, data files, and/or one or more executables or applications. The LPA 146 may be considered to be an agent for assisting operations of the eUICC 134. The LPA 146 may provide data buffering for downloading and installing eSIM profiles in the eUICC 134. The LPA 146 may support retrieval of notifications from a subscription management discovery server (SM-DS). The LPA 146 may mediate between a local user interface of the UE 102 and the eUICC 134 to support a device user switching active eSIMs of the UE 102. In an embodiment, the LPA 146 may do instruction interpretation, for example mapping between high-level API methods presented by the LPA 146 to applications on the UE 102 and low-level commands understood by the eUICC 134. While illustrated in FIG. 2 as located in the system memory 140, in an embodiment the LPA 146 may be disposed in the eUICC 134.

The user memory 142 may comprise one or more user applications 152. The system applications 150 may be applications that are installed in the system memory 140, for example installed by an original equipment manufacturer (OEM) of the UE 102. User applications 152 may be installed by users downloading applications from Internet web sites or application stores. Because system applications 150 are known and fixed (e.g., their configuration is controlled by the OEM) and are typically declared by the OEM when the UE 102 is certified, these system applications 150 may be considered trusted (because only the OEM or a wireless communication service provider having a proprietary interest in the UE 102 can install system applications 140 in the system memory 140) and may be granted access privileges denied to user applications 152.

In an embodiment, the eUICC 134 stores one or more eSIM profiles 148 including an eSIM profile 136 which may be an active eSIM profile. In an embodiment, more than one eSIM profile in the eUICC 134 may be active at the same time. The LPA 146 provides an application programming interface (API) for requesting management actions on the eSIM profiles 148 and/or the eSIM profile 136. These management actions may comprise installing an eSIM profile in the eUICC 134, enabling an eSIM profile (e.g., making a specific eSIM profile active in the eUICC 134), disabling an eSIM profile (e.g., making a specific eSIM profile inactive in the eUICC 134), and deleting an eSIM profile from the eUICC 134. The LPA 146, in response to API requests, conveys these requests to the eUICC 134, and the eUICC 134 performs or rejects the subject eSIM profile management action requests. It will be appreciated that these eSIM profile management actions can have significant effects on the operation of the UE 102, and hence access to these management actions may desirably be restricted. The present disclosure teaches a framework for the eUICC 134, sometimes with assistance from the LPA 146 (e.g., when prompting for device user consent input), restricting access to eSIM profile management actions based on an identity of a requestor (an entity or an application that invokes an API method of the LPA 146) and based on a definition of eSIM profile management rules encapsulated in the subject eSIM profile.

In an embodiment, the management actions may further comprise installing an eSIM profile subject to user consent, enabling an eSIM profile subject to user consent, deleting an eSIM profile subject to user consent, or disabling an eSIM profile subject to user consent. In these management actions, a category of requestor may provisionally be granted a right to initiate an eSIM profile management action but subject to a user consenting to the management action. When a requestor requests a management action, and the eSIM profile management rule that applies to the requestor requires user consent, the eUICC 134 requests the LPA 146 to present a window on a display of the UE 102 that describes the requested eSIM profile management action and prompts the user to consent or reject the request. If the user inputs a consent, the provisionally allowed eSIM profile management action is performed by the eUICC 134; if the user inputs a rejection, the provisionally allowed eSIM profile management action is rejected and is not performed by the eUICC 134. When the UE 102, 104 is an IoT device, the UE 102, 104 may not have a local user interface. In this case, the user consent may be requested by the LPA 146 from a remote input device, for example from a workstation connected to the network 108, where the workstation is associated with the wireless communication service subscriber that owns the subject IoT device.

The right side of the FIG. 2 provides a detail of the contents of an eSIM profile 148. The eSIM profile 148 comprises wireless communication service provider data 160, wireless communication service subscriber data 162, one or more applications 164 or other executable logic (e.g., SIM apps), and eSIM profile management rules 166. It is understood that each different eSIM profile may have different service provider data, different subscriber data, different applications 164, and different eSIM profile management rules 166. In an embodiment, the service provider data 160 and the service subscriber data 162 may not be stored separately but may be intermingled. The service provider data 160 and the service subscriber data 162 may comprise one or more of (1) a phone number, (2) network access keys and network access credentials, (3) encryption keys, (4) preferred roaming lists (PRLs), and/or (5) branding content. Because the eSIM profile management rules 166 are encapsulated within the eSIM profile 148, the eSIM profile management rules 166 are protected from modification just as the other contents of the eSIM profile 148 are protected from modification. In an embodiment, the eSIM Profile 148, including the eSIM profile management rules 166, may be modifiable by the service provider that owns the subject eSIM profile 148, for example using open mobile alliance (OMA) over-the-air (OTA) protocols.

Each different wireless communication service provider may define its own eSIM profile management rules 166 that will be applied by the eUICC 134 and/or the LPA 146 to any requested management actions directed to that specific eSIM profile 148. Thus, a first invocation of the API of the LPA 146 requesting an eSIM profile management action be performed on a first eSIM profile 148 is restricted by the eUICC 134 based on a first set of eSIM profile management rules encapsulated in the first eSIM profile 148, and a second invocation of the API of the LPA 146 requesting an eSIM profile management action be performed on a second eSIM profile 148 is restricted by the eUICC 134 based on a second set of eSIM profile management rules encapsulated in the second eSIM profile 148. In an embodiment, the same eSIM profile management rules 166 defined by a service provider may be applied or built into a plurality of eSIM profiles owned by the service provider.

In an embodiment, the eSIM profile management rules 166 may be implemented as a table that defines whether a given eSIM profile management operation is allowed or disallowed for a specific category of requestor. In an embodiment, the eSIM profile management rules 166 may be implemented by a bit field, where each different bit position of a digital word represents whether a given eSIM profile management operation is allowed or disallowed for a specific category of requestor or for a specific requestor. For example, a bit value of '0' may indicate that the eSIM profile management operation is disallowed, and a bit value of '1' may indicate that the eSIM profile management operation is allowed. Alternatively, a bit value of '0' may indicate that the eSIM profile management operation is allowed, and a bit value of '1' may indicate that the eSIM profile management operation is disallowed. For example, a set of eSIM profile management rules for each of three categories of requestors for each of the management actions of install, enable, disable, and delete could be defined by 12 bits. In an embodiment, a fifth management action may be "do not delete on eUICC memory reset" for each of three categories of requestors with an additional 3 bits, hence a total of 15 bits. Each different bit position can be thought of as defining one eSIM profile management rule—for example, a rule applying to a requestor that is identified as a system application 150 for the specific eSIM profile management action of installing an eSIM profile. A different bit position defining how a requestor that is identified as a system application 150 for the different eSIM profile management action of enabling an eSIM profile may be thought of as defining a different eSIM profile management rule. Thus, an eSIM profile management rules 166 artifact can be thought of as a set of eSIM management action rules that apply to the eSIM profile 148 that encapsulates the eSIM profile management rule 166.

In an embodiment, three categories of requestors may be (1) the device user via a local user interface (e.g., a user interface presented on a screen of the UE) or, in the case of an IoT device that lacks a local user interface, a remote user interface; (2) system applications 150 (this category could include the operating system of the UE 102); and (3) user applications 152. In an embodiment, four categories of requestors may be (1) the device user via a local user interface or via a remote user interface (e.g., in case of IoT device), (2) system applications 150 and the operating system, (3) pre-approved user applications 152, and (4) user applications 152 that are non-pre-approved or are disapproved. If four different categories of requestors and four different eSIM profile management actions are supported, the set of eSIM profile management rules may be represented with 16 bits. If four different categories of requestors and five different eSIM profile management actions are supported, the set of eSIM profile management rules may be represented with 20 bits. Up to six different categories of requestors and five different eSIM profile management actions can be defined by a set of eSIM profile management rules bit coded in a 32-bit word (with two bits unused or reserved for another purpose). Up to twelve different categories of requestors and five different eSIM profile management actions can be defined by a set of eSIM profile management rules bit coded in a 64-bit word (with four bits unused or reserved for another purpose). In an embodiment, some of the categories of requestors may be associated with a single specific application. In an embodiment, some of the categories of requestors may be associated with a single specific application provider.

When the eUICC 134 receives a request from the LPA 146 (e.g., a request from an application forwarded by the LPA 146), the eUICC 134 determines an identity of the eSIM profile 148 that is the object of the API invocation, determines the identity of the requestor, and determines a category to which the requestor belongs. The eUICC 134 looks up the eSIM profile management rules 166 associated with the identified eSIM profile 148. The eUICC 134 determines, based on the requested eSIM profile management action (e.g., which method of the API of the LPA 146 is invoked) and the category of the requestor, whether the requested eSIM profile management action is allowed/disallowed based on applying the rule encoded in the eSIM profile management rule 166 that applies. If the action is allowed, the eUICC 134 performs the requested eSIM profile management action. If the action is not allowed, the eUICC 134 does not perform the requested eSIM profile management action. In an embodiment, it is an eSIM profile policy enabler application or routine within the eUICC 134 that performs the actions described in this paragraph and enforces the eSIM profile management rules 166.

In an embodiment, the eSIM profile management rules 166 further define what action to take on the event of requested action being disallowed. In an embodiment, the action is to send a notification to be presented by the user interface 144 on a display of the UE 102 and may apply to all requestors. In an embodiment, the action may be defined differently for different categories of requestors. In an embodiment, the action may be defined differently for different categories of requestors and/or differently for different eSIM profile management action requested. In an embodiment, one of the actions that may be specified to take on the event of a requested action being disallowed is to trigger execution of a remote action, for example to send a notification to a remote destination via the cellular radio transceiver 138 to a server associated with the service provider, wherein the server responds to the received notification by executing a method or process.

In an embodiment, the eUICC 134 permits owners of eSIM profiles 148 to perform eSIM profile management actions remotely, for example to delete and to install an eSIM profile 148 which they own or have rights to. In this way, a wireless communication service provider may be enabled to update the eSIM profile management rules 166 associated with an eSIM profile 148 that this wireless communication service provider owns or has rights to. The eUICC 134 may store information that associates wireless communication service providers to specific eSIM profiles 148 and authentication credentials whereby to validate that a request to perform such an update is legitimate and is actually arriving from the claimed wireless communication service provider.

It will be appreciated that the policy-based management of eSIM profiles may be performed in different ways than described above without departing from the teachings of the present disclosure. For example, at least some of the processing described above as being performed by the eUICC 134 may be performed instead by the LPA 146. The eSIM profiles 136 may be stored in the eUICC 134, and the LPA 146 may request from the eUICC 134 a specific set of eSIM profile management rules 166 from the eSIM profile 136, 148 associated with a request to perform an eSIM profile management action. The LPA 146 may then evaluate if the requested eSIM profile management action can be performed. If the LPA 146 determines that the requested eSIM profile management action is allowed, it may invoke commands of the eUICC 134 to complete the requested eSIM profile management action. In this example, it is the LPA 146 and not the eUICC 134 that determines whether an action will or will not be performed. In an embodiment, the LPA 146 may be stored in a secure element portion of the memory 132 and the executable logic of the LPA 146 (e.g., software and/or firmware) may be executed in a secure element portion of the processor 130.

Figure 3A:
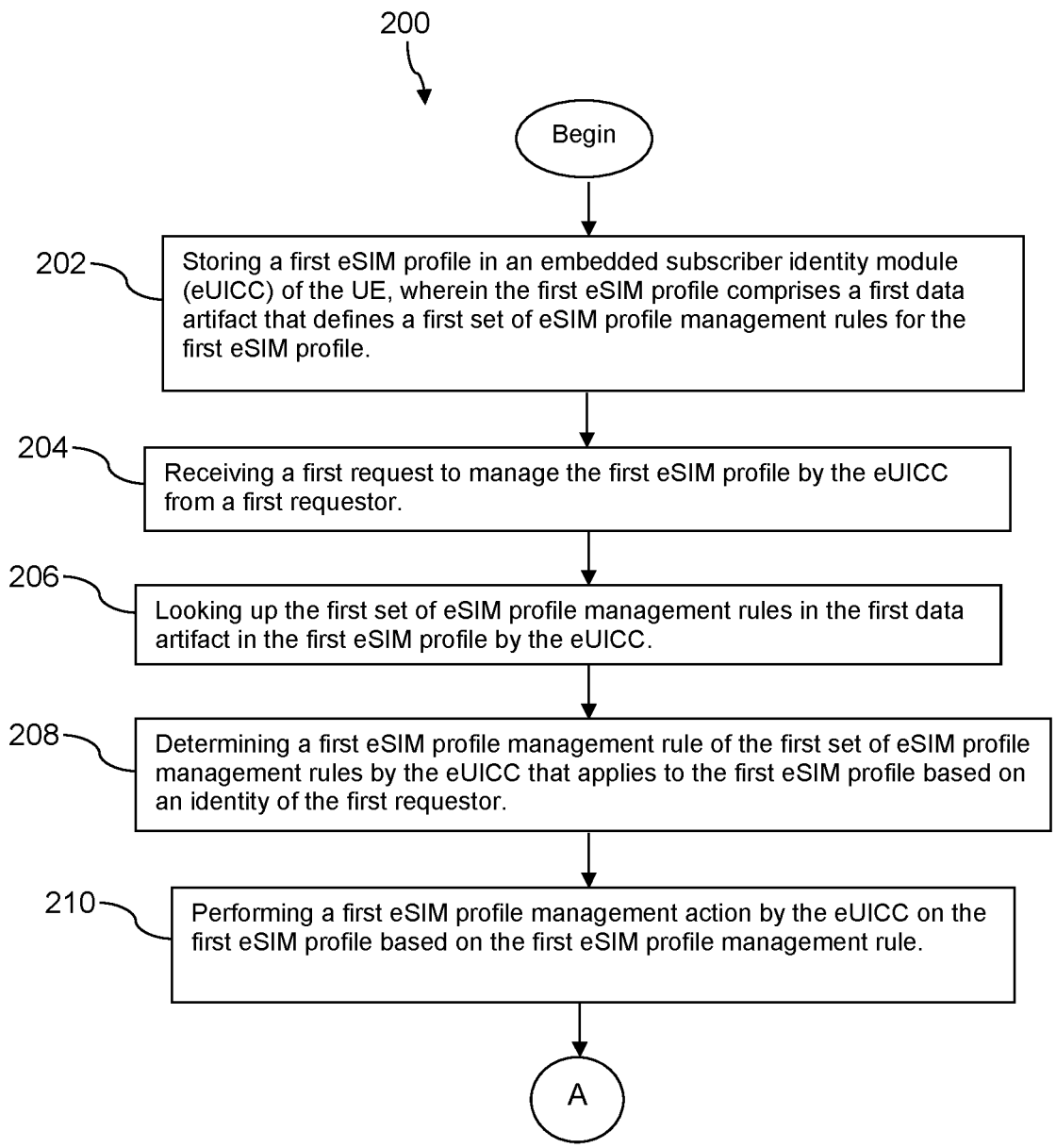
FIG. 3A and FIG. 3B are a flow chart of a method according to an embodiment of the disclosure.
Figure 3B:
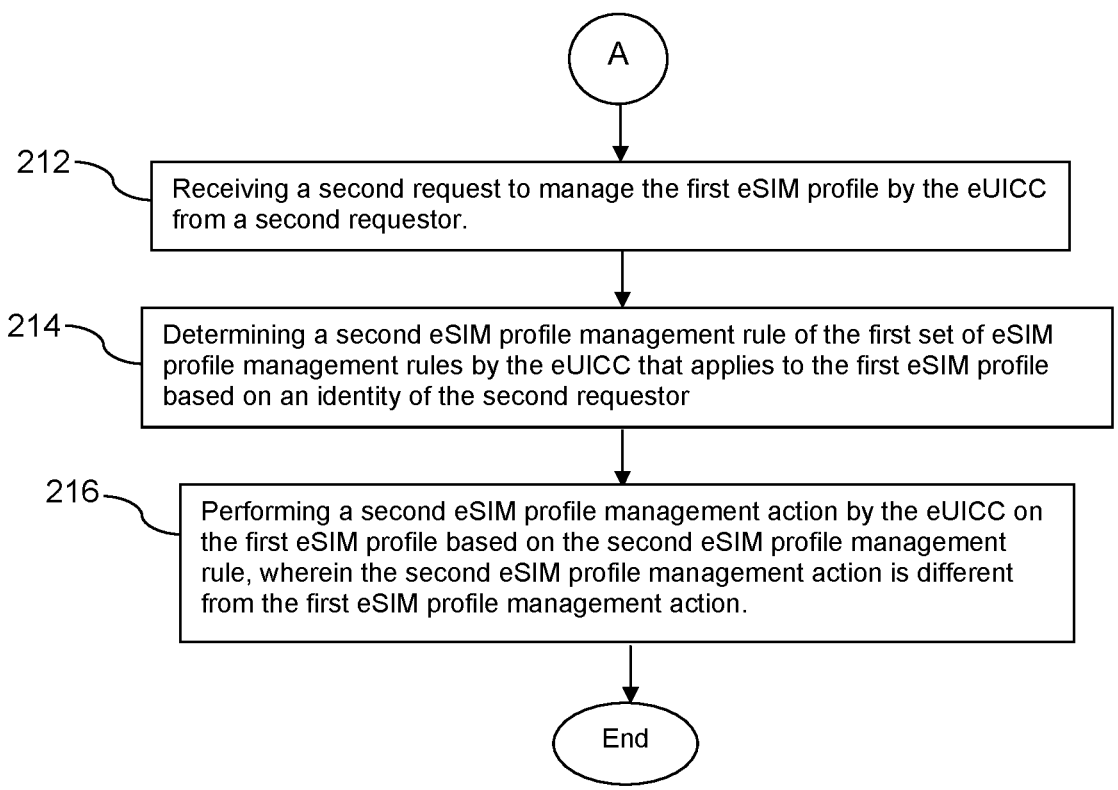

Turning now to FIG. 3A and FIG. 3B, a method 200 is described. In an embodiment, the method 200 is a method of managing embedded subscriber identity modules (eSIMs) on a user equipment (UE). The method 200 may be considered to be a method of policy-based management of eSIM profiles. At block 202, the method 200 comprises storing a first eSIM profile in an embedded universal integrated circuit card (eUICC) of the UE, wherein the first eSIM profile comprises a first data artifact that defines a first set of eSIM profile management rules for the first eSIM profile. In an embodiment, the first data artifact is one of a table or a bit field. In an embodiment, the first set of eSIM profile management rules associate different rules to different categories or requestors, wherein the categories of requestors comprise a user interface category, a system application category, and a user application category. Alternatively, in an embodiment, the first set of eSIM profile management rules associate different rules to different categories or requestors, wherein the categories of requestors comprise a user interface category, a system application category, and a pre-approved user application category, and a non-pre-approved user application category. In an embodiment, the first eSIM profile comprises at least three items selected from the group consisting of (1) a phone number, (2) a network access key or a network access credential, (3) an encryption key, (4) a preferred roaming list (PRL), (5) branding content, and (6) an executable application.

At block 204, the method 200 comprises receiving a first request to manage the first eSIM profile by the eUICC from a first requestor. For example, the first requestor may send the first request to manage the first eSIM profile to the LPA 146, and the LPA 146 may forward the first request to manage the first eSIM profile to the eUICC 134, including an identity of the first requestor. At block 206, the method

200 comprises looking up the first set of eSIM profile management rules in the first data artifact in the first eSIM profile by the eUICC.

At block 208, the method 200 comprises determining a first eSIM profile management rule of the first set of eSIM profile management rules by the eUICC that applies to the first eSIM profile based on an identity of the first requestor. At block 210, the method 200 comprises performing a first eSIM profile management action by the eUICC on the first eSIM profile based on the first eSIM profile management rule.

At block 212, the method 200 comprises receiving a second request to manage the first eSIM profile by the eUICC from a second requestor. For example, a second requestor may send the second request to manage the first eSIM profile to the LPA 146, and the LPA 146 may forward the second request to manage the first eSIM profile to the eUICC 134, including an identity of the second requestor. At block 214, the method 200 comprises determining a second eSIM profile management rule of the first set of eSIM profile management rules by the eUICC that applies to the first eSIM profile based on an identity of the second requestor. At block 216, the method 200 comprises performing a second eSIM profile management action by the eUICC on the first eSIM profile based on the second eSIM profile management rule, wherein the second eSIM profile management action is different from the first eSIM profile management action.

In an embodiment, the method 200 further comprises storing a second eSIM profile in the eUICC, wherein the second eSIM profile comprises a second data artifact that defines a second set of eSIM profile management rules for the second eSIM profile; receiving a third request to manage the second eSIM profile by the eUICC from the first requestor; looking up the second set of eSIM profile management rules in the second data artifact in the second eSIM profile by the eUICC; determining a third eSIM profile management rule of the second set of eSIM profile management rules by the eUICC that applies to the second eSIM profile based on the identity of the first requestor; and performing a third eSIM profile management action by the eUICC on the second eSIM profile based on the third eSIM profile management rule. In an embodiment, the first request and the third request designate the same requested eSIM profile management action and the same requestor, but the request for the first eSIM profile management action results in performing the requested action on the first eSIM profile by the eUICC and the request for the third eSIM profile management action results in rejecting the requested action on the second eSIM profile by the eUICC because the eSIM profile management rules that apply to the first requestor in the first data artifact are different from the management rules that apply to the first requestor in the second data artifact. In this example, the first requestor may send the third request to manage the second eSIM profile to the LPA 146, and the LPA 146 may forward the third request to manage the second eSIM profile to the eUICC 134, including the identity of the first requestor. At least some of the processing of the method 200 ascribed to the eUICC in the description above may be performed by a profile policy enabler executing within the eUICC. In an embodiment, at least some of the processing ascribed to the eUICC in the description of method 200 above may be performed by the LPA 146.

Figure 4:
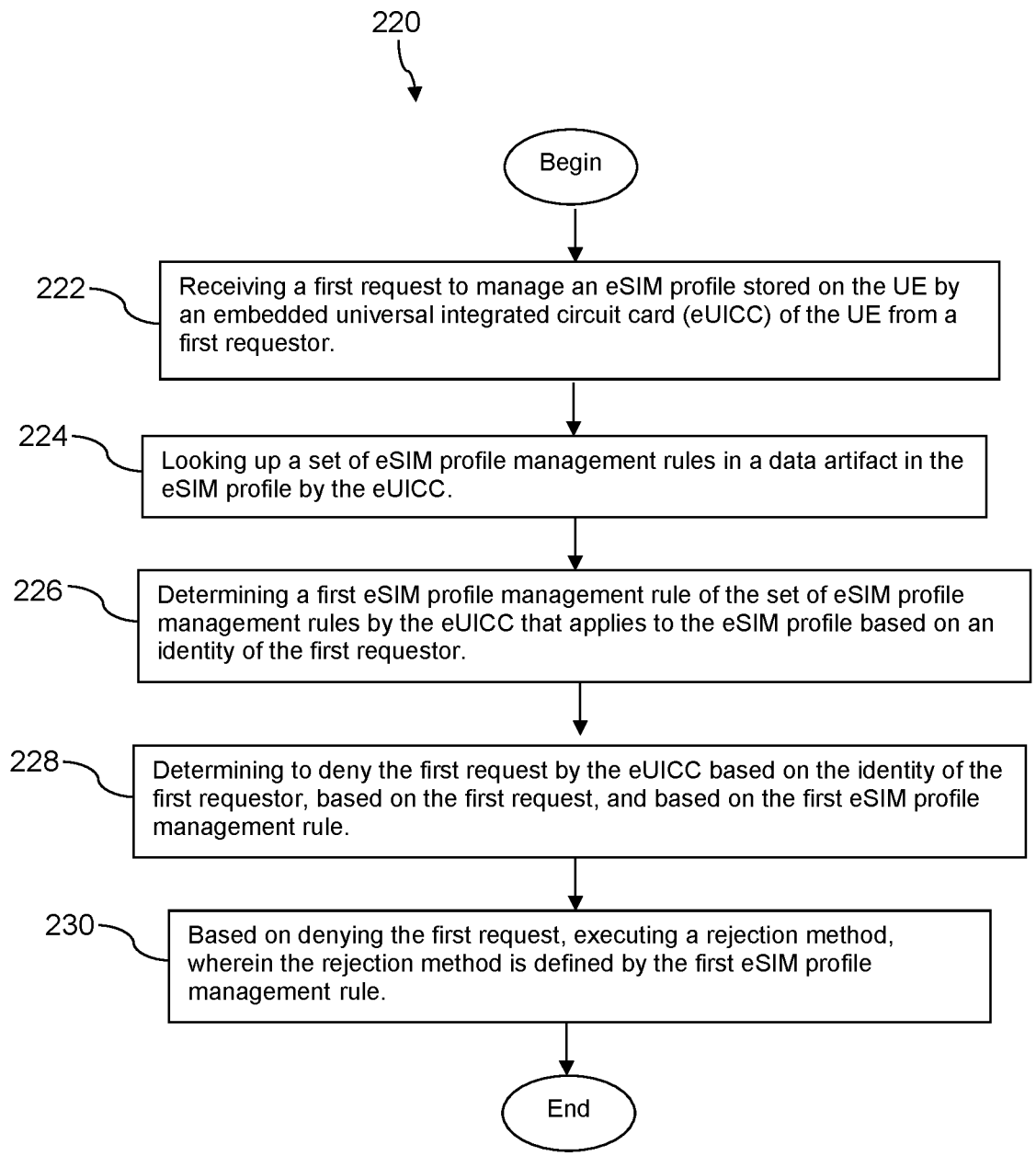
FIG. 4 is a flow chart of another method according to an embodiment of the disclosure.

Turning now to FIG. 4, a method 220 is described. In an embodiment, the method 220 is a method of managing embedded subscriber identity modules (eSIMs) on a user equipment (UE). The method 220 may be considered to be a method of policy-based management of eSIM profiles. At block 222, the method 220 comprises receiving a first request to manage an eSIM profile stored on the UE by an embedded universal integrated circuit card (eUICC) from a first requestor. For example, the first requestor may send the first request to manage the eSIM profile to the LPA 146, and the LPA 146 may forward the first request to manage the eSIM profile to the eUICC 134, including an identity of the first requestor.

At block 224, the method 220 comprises looking up a set of eSIM profile management rules in a data artifact in the eSIM profile by the eUICC. In an embodiment, the data artifact is one of a table or a bit field. At block 226, the method 220 comprises determining a first eSIM profile management rule of the set of eSIM profile management rules that applies to the eSIM profile by the eUICC based on an identity of the first requestor.

At block 228, the method 220 comprises determining to deny the first request by the eUICC based on the identity of the first requestor, based on the first request (e.g., the specific eSIM profile management action requested), and based on the first eSIM profile management rule. At block 230, the method 220 comprises, based on denying the first request, executing a rejection method, wherein the rejection method is defined by the first eSIM profile management rule. In an embodiment, the rejection method presents a message on a display of the UE. In an embodiment, the rejection method sends a notification via a cellular radio transceiver of the UE to a wireless communication service provider associated with the eSIM profile. In an embodiment, the rejection method suspends future execution of an application that is the first requestor. In an embodiment, the method 220 further comprises receiving a second request to manage the eSIM profile by the eUICC from a second requestor (e.g., the LPA 146 may receive the second request and forward it on to the eUICC 136); determining a second eSIM profile management rule of the set of eSIM profile management rules by the EUICC that applies to the eSIM profile based on an identity of the second requestor; determining to allow the second request by the eUICC based on the identity of the second requestor, based on the second request (e.g., the specific eSIM management action requested), and based on the second eSIM profile management rule; and completing the eSIM management action requested by the second request. At least some of the processing of method 220 ascribed to the eUICC in the description above may be performed by a profile policy enabler executing within the eUICC. In an embodiment, at least some of the processing ascribed to the eUICC in the description of method 220 above may be performed by the LPA 146.

Figure 5:
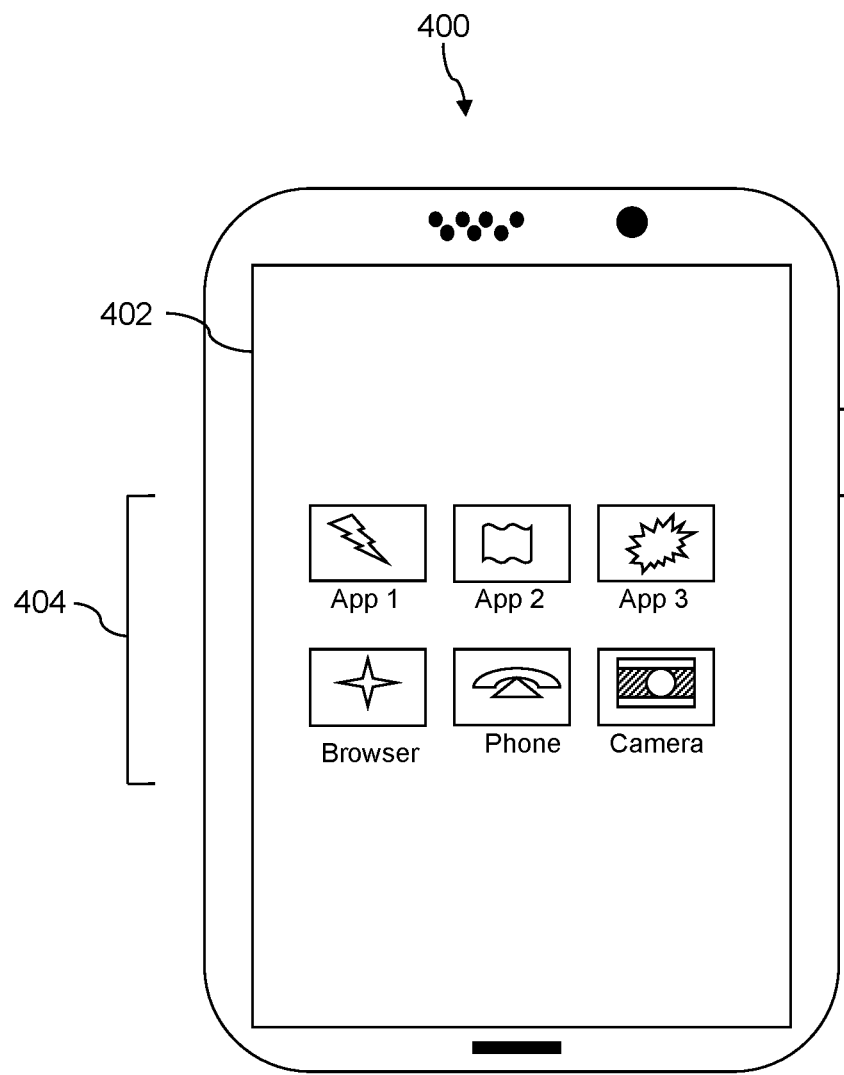
FIG. 5 is an illustration of a handset according to an embodiment of the disclosure.

FIG. 5 depicts the user equipment (UE) 400, which is operable for implementing aspects of the present disclosure, but the present disclosure should not be limited to these implementations. Though illustrated as a mobile phone, the UE 400 may take various forms including a wireless handset, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 6:
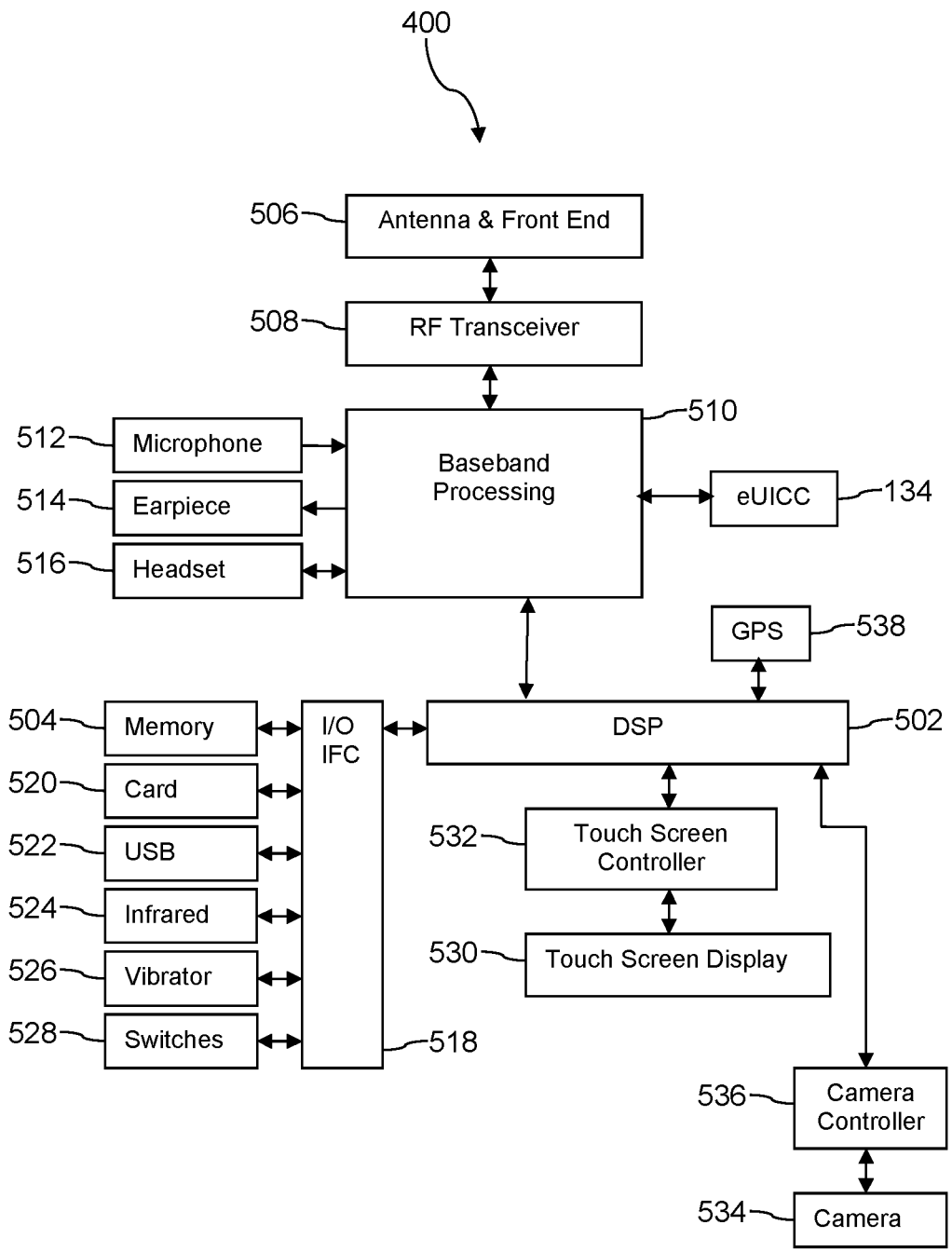
FIG. 6 is a block diagram of a mobile communication device according to an embodiment of the disclosure.

FIG. 6 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include one or more antenna and front end unit 506, a one or more radio frequency (RF) transceiver 508, a baseband processing unit 510, the eUICC 134, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen display 530, a touch screen controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. In an embodiment, the eUICC 134 is a separate semiconductor chip that is communicatively coupled to the baseband processing unit 510. In another embodiment, the eUICC 134 may be integrated into the baseband processing unit 510, for example in a protected or trusted portion (e.g., a secure element) of the baseband processing unit 510. The baseband processing unit 510 may provide data requested from the eUICC 134 (e.g., at least some of service provider data 160 and/or at least some of service subscriber data 162) to the RF transceiver 508 to obtain a RF link from a cell site (e.g., cell site 106, 110).

The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations.

In an embodiment, one or more of the radio transceivers is a cellular radio transceiver. A cellular radio transceiver promotes establishing a wireless communication link with a cell site according to one or more of a 5G, a long-term evolution (LTE), a code division multiple access (CDMA), a global system for mobile communications (GSM) wireless communication protocol. In an embodiment, one of the radio transceivers 508 may comprise a near field communication (NFC) transceiver. The NFC transceiver may be used to complete payment transactions with point-of-sale terminals or other communications exchanges. In an embodiment, each of the different radio transceivers 508 may be coupled to its own separate antenna. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 7A:
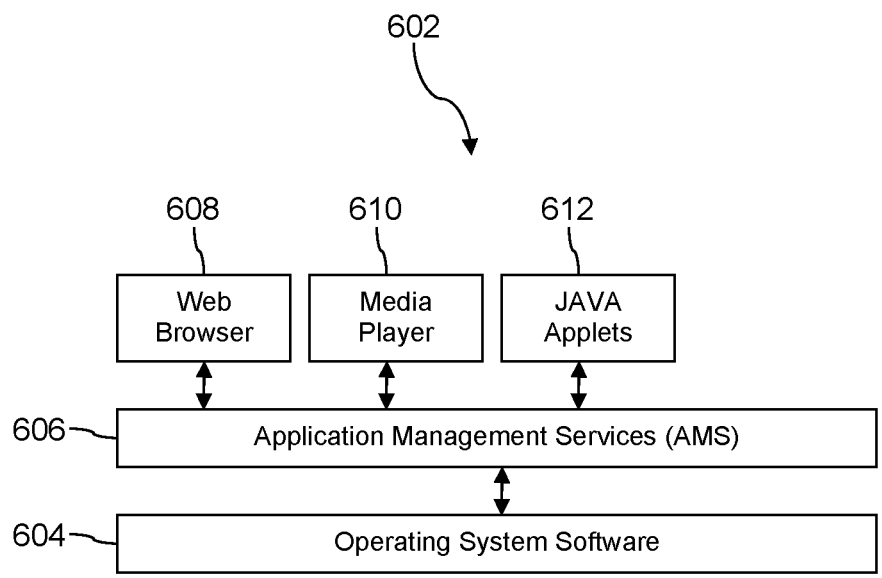
FIG. 7A is a block diagram of a software architecture according to an embodiment of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 7A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 7B:
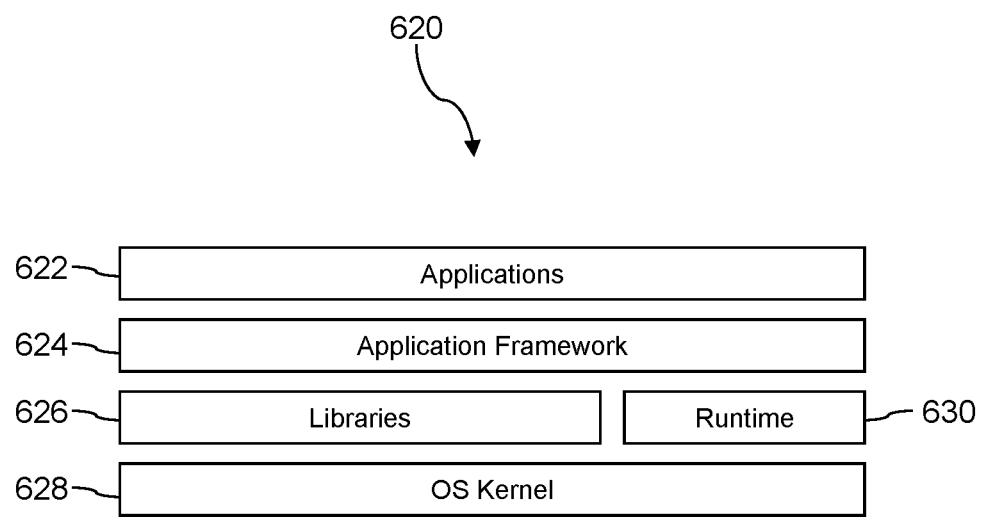
FIG. 7B is a block diagram of another software architecture according to an embodiment of the disclosure.

FIG. 7B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
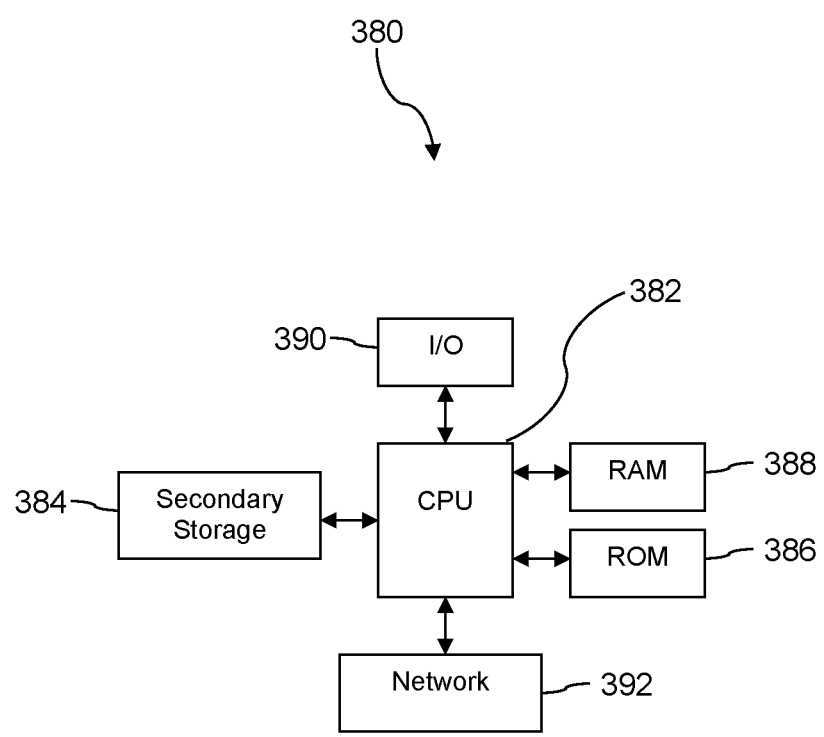
FIG. 8 is a block diagram of a computer system according to an embodiment of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of managing embedded subscriber identity modules (eSIMs) on a user equipment (UE), comprising:
storing a first eSIM profile in an embedded universal integrated circuit card (eUICC) of the UE, wherein the first eSIM profile comprises a first data artifact that defines a first set of eSIM profile management rules for the first eSIM profile;
receiving a first request to manage the first eSIM profile by the eUICC from a first requestor;
looking up the first set of eSIM profile management rules in the first data artifact in the first eSIM profile by the eUICC, wherein the first set of eSIM profile management rules associate different rules to different categories of requestors, and wherein the categories of requestors comprise a user interface category, a system application category, and a user application category;
determining a first eSIM profile management rule of the first set of eSIM profile management rules by the eUICC that applies to the first eSIM profile based on an identity of the first requestor;
performing a first eSIM profile management action by the eUICC on the first eSIM profile based on the first eSIM profile management rule;
receiving a second request to manage the first eSIM profile by the eUICC from a second requestor;
determining a second eSIM profile management rule of the first set of eSIM profile management rules by the eUICC that applies to the first eSIM profile based on an identity of the second requestor; and
performing a second eSIM profile management action by the eUICC on the first eSIM profile based on the second eSIM profile management rule, wherein the second eSIM profile management action is different from the first eSIM profile management action.

2. The method of claim 1, further comprising:
storing a second eSIM profile in the eUICC, wherein the second eSIM profile comprises a second data artifact that defines a second set of eSIM profile management rules for the second eSIM profile;
receiving a third request to manage the second eSIM profile by the eUICC from the first requestor;
looking up the second set of eSIM profile management rules in the second data artifact in the second eSIM profile by the eUICC;
determining a third eSIM profile management rule of the second set of eSIM profile management rules by the eUICC that applies to the second eSIM profile based on an identity of the first requestor; and
performing a third eSIM profile management action by the eUICC on the second eSIM profile based on the third eSIM profile management rule.

3. The method of claim 2, wherein the first request and the third request designate the same requested eSIM profile management action but the first eSIM profile management action comprises performing the requested action on the first eSIM profile by the eUICC and the third eSIM profile management application comprises rejecting the requested action on the third eSIM profile by the eUICC because the eSIM profile management rules that apply to the first requestor in the first data artifact are different from the management rules that apply to the first requestor in the second data artifact.

4. The method of claim 1, wherein the user application category comprises a pre-approved user application category and a non-pre-approved user application category.

5. The method of claim 1, wherein the first eSIM profile comprises at least three items selected from the group consisting of (1) a phone number, (2) a network access key or a network access credential, (3) an encryption key, (4) a preferred roaming list (PRL), (5) branding content, and (6) an executable application.

6. The method of claim 1, wherein the UE is one of a mobile phone, a smart phone, a wearable computer, a headset computer, a laptop computer, a notebook computer, a tablet computer, or an Internet of things (IoT) device.

7. A user equipment (UE) that provides management of embedded subscriber identity module (eSIM) profiles, comprising:
a cellular radio transceiver;
a processor;
an embedded universal integrated circuit card (eUICC) storing a plurality of eSIM profiles, wherein each eSIM profile comprises a data artifact that defines a set of eSIM profile management rules that
receives a first request to manage a first eSIM profile from a first requestor, where the first eSIM profile is one of the plurality of eSIM profiles stored in the non-transitory memory,
looks up a first set of eSIM profile management rules stored in a data artifact of the first eSIM profile,
determines a first eSIM profile management rule of the first set of eSIM profile management rules that applies to the first eSIM profile based on an identity of the first requestor, wherein determining the first eSIM profile management rule of the first set of eSIM profile management rules that applies to the first eSIM profile is based on whether the requestor is a user interface of the UE, a system application stored in a system memory partition of the non-transitory memory, or a user application stored in a user memory partition of the non-transitory memory, and
performs a first eSIM profile management action on the first eSIM profile based on the first eSIM profile management rule.

8. The UE of claim 7, wherein the eUICC further
receives a second request to manage the first eSIM profile from a second requestor;
determines a second eSIM profile management rule of the first set of eSIM profile management rules that applies to the first eSIM profile based on an identity of the second requestor; and
performs a second eSIM profile management action on the first eSIM profile based on the second eSIM profile management rule, wherein the second eSIM profile management action is different from the first eSIM profile management action.

9. The UE of claim 7, wherein one of the eSIM profiles comprises at least three items selected from the group consisting of (1) a phone number, (2) a network access key or a network access credential, (3) an encryption key, (4) a preferred roaming list (PRL), (5) branding content, and (6) an executable application.

10. The UE of claim 7, wherein the eUICC, further:
receives a second request via the cellular radio transceiver to update a second eSIM profile from among the plurality of eSIM profiles stored in the eUICC, wherein the second request comprises authentication credentials associated with a wireless communication service provider that provided the second eSIM profile;
validates the authentication credentials provided in the second request; and
updates the second eSIM profile.

11. The UE of claim 10, wherein the eUICC updates the second eSIM profile by deleting the second eSIM profile from the eUICC and, after deleting the second eSIM profile, installing a different version of the second eSIM profile in the eUICC.

12. A method of managing embedded subscriber identity modules (eSIMs) on a user equipment (UE), comprising:
- receiving a first request to manage an eSIM profile by an embedded universal integrated circuit card (eUICC) of the UE from a first requestor, wherein the eSIM profile is stored in the eUICC;
- looking up a set of eSIM profile management rules in a data artifact in the eSIM profile by the eUICC, wherein the set of eSIM profile management rules associate different rules to different categories of requestors, and wherein the categories of requestors comprise a user interface category, a system application category, and a user application category;
- determining a first eSIM profile management rule of the set of eSIM profile management rules that applies to the eSIM profile by the eUICC based on an identity of the first requestor;
- determining to deny the first request by the eUICC based on the identity of the first requestor, based on the first request, and based on the first eSIM profile management rule; and
- based on denying the first request, executing a rejection method, wherein the rejection method is defined by the first eSIM profile management rule.

13. The method of claim 12, wherein the rejection method presents a message on a display of the UE.

14. The method of claim 12, wherein the rejection method sends a notification via a cellular radio transceiver of the UE to a wireless communication service provider associated with the eSIM profile.

15. The method of claim 12, wherein the rejection method suspends future execution of an application that is the first requestor.

16. The method of claim 12, further comprising:
- receiving a second request to manage the eSIM profile by the eUICC from a second requestor;
- determining a second eSIM profile management rule of the set of eSIM profile management rules by the eUICC that applies to the eSIM profile by the based on an identity of the second requestor;
- determining to allow the second request by the eUICC based on the identity of the second requestor, based on the second request, and based on the second eSIM profile management rule; and
- completing the eSIM management action requested by the second request by the eUICC.

17. The method of claim 12, wherein the UE is one of a mobile phone, a smart phone, a wearable computer, a headset computer, a laptop computer, a notebook computer, a tablet computer, or an Internet of things (IoT) device.

18. The method of claim 12, wherein the data artifact is one of a table or a bit field.

* * * * *